US012181133B2

(12) United States Patent
Wang

(10) Patent No.: US 12,181,133 B2
(45) Date of Patent: Dec. 31, 2024

(54) LIGHT SOURCE ASSEMBLY AND LAMP

(71) Applicants: SUZHOU OPPLE LIGHTING CO., LTD., Suzhou (CN); OPPLE LIGHTING CO., LTD., Shanghai (CN)

(72) Inventor: Quanbiao Wang, Suzhou (CN)

(73) Assignees: SUZHOU OPPLE LIGHTNG CO., LTD., Suzhou (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/518,838

(22) Filed: Nov. 24, 2023

(65) Prior Publication Data

US 2024/0093861 A1 Mar. 21, 2024

Related U.S. Application Data

(63) Continuation of application No. PCT/US2022/092692, filed on May 13, 2022.

(51) Int. Cl.
*F21V 19/00* (2006.01)

(52) U.S. Cl.
CPC .................................. *F21V 19/004* (2013.01)

(58) Field of Classification Search
CPC .... F21V 19/004; F21V 19/003; F21V 23/005; F21Y 2115/10; F21Y 2105/00; H05K 3/326
See application file for complete search history.

(56) References Cited

U.S. PATENT DOCUMENTS 7,874,699 B2 * 1/2011 Liang ...................... F21K 9/233 362/249.02

FOREIGN PATENT DOCUMENTS

| | | | |
|---|---|---|---|
| CN | 201196350 Y | 2/2009 | |
| CN | 206875175 U | 1/2018 | |
| CN | 208139015 U | 11/2018 | |
| CN | 211372054 U | 8/2020 | |
| CN | 212230297 U | 12/2020 | |
| CN | 212805359 U | 3/2021 | |
| CN | 214535869 U | 10/2021 | |
| WO | WO-2017153394 A1 * | 9/2017 | ............ F21V 19/004 |

OTHER PUBLICATIONS

International Search Report of PCT/CN2022/092692 dated Jul. 29, 2022 with English translation.

* cited by examiner

*Primary Examiner* — Omar Rojas Cadima
(74) *Attorney, Agent, or Firm* — Arch & Lake LLP; Shen Wang; Hao Tan

(57) ABSTRACT

The present disclosure discloses a light source assembly, including a light source element, a circuit board and a light source holder which are sequentially stacked. The circuit board is provided with an elastic member, and the light source element is elastically connected to the circuit board through the elastic member, the light source holder is provided with a snap-fit portion, and an entirety constituted by the light source element and the circuit board is snap-fitted at the light source holder through the snap-fit portion.

8 Claims, 3 Drawing Sheets

LIGHT SOURCE ASSEMBLY AND LAMP

CROSS-REFERENCE TO THE RELATED APPLICATION

This application is based upon and claims the priority of PCT patent application No. PCT/CN2022/092692 filed on May 13, 2022 which claims priority to the Chinese patent application No. 202121122273.5 filed on May 24, 2021, the entire contents of which are hereby incorporated by reference herein for all purposes.

TECHNICAL FIELD

The present disclosure relates to the technical field of lighting, in particular to a light source assembly and a lamp.

BACKGROUND

A light source board in which a light source element and a circuit board are soldered integrally is usually used in the lighting field, then the light source board is installed in a lamp. The light source board is clamped and fixed inside the lamp by using a clamping device.

SUMMARY

The present disclosure provides a light source assembly and a lamp.

According to a first aspect, a light source assembly is provided, the light source assembly may include a light source element, a circuit board and a light source holder which are sequentially stacked, where the circuit board may be provided with an elastic member, and the circuit board may be elastically connected to the light source element through the elastic member, the light source holder may be provided with a snap-fit portion, and an entirety constituted by the light source element and the circuit board may be snap-fitted at the light source holder through the snap-fit portion.

Further, the circuit board may be provided with a first light-transmitting hole, the elastic member may be an elastic strip, and the elastic strip may be located at an outer fringe of the first light-transmitting hole; a light-emitting side of the light source element may be connected to the elastic strip, the light-emitting side may be provided with a light-emitting area, and the light-emitting area may be orientated towards the first light-transmitting hole.

According to another aspect, a lamp is provided. The lamp may include an electrical box assembly, a housing a the light source assembly as described above; the housing may be provided with a first housing opening and a second housing opening arranged opposite to each other, the electrical box assembly may be disposed at the first housing opening, the light source assembly may be disposed inside the housing, the light source assembly may be connected to the housing through the light source holder, and a light-emitting side of the light source element may be oriented towards the second housing opening.

It is to be understood that both the foregoing general description and the following detailed description are exemplary and explanatory only and are not restrictive of the present disclosure.

BRIEF DESCRIPTION OF THE DRAWINGS

The accompanying drawings illustrated here are provided for further understanding of the present disclosure and constitute a part of the present disclosure. The illustrative examples of the present disclosure and their descriptions are used to explain the present disclosure and do not constitute an undue limitation of the present disclosure. In the accompanying drawings.

DETAILED DESCRIPTION

Figure 1:
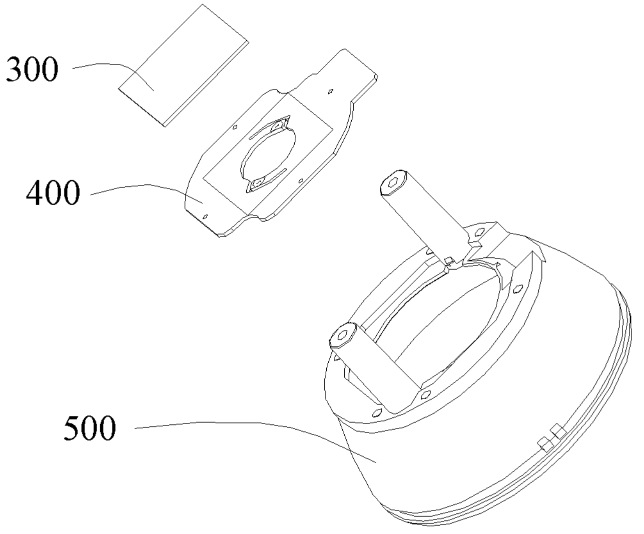
FIG. 1 is an exploded diagram of a light source assembly disclosed in examples of the present disclosure.

In order to make objects, technical solutions and advantages of the disclosure more apparent, the technical solutions of the disclosure will be described in a clearly and fully understandable way in connection with examples of the disclosure and corresponding drawings. Apparently, the described examples are just a part but not all of the examples of the disclosure. Based on the described examples herein, those ordinary skilled in the art can obtain all other example(s), without any inventive work, which should be within the scope of protection of the disclosure.

Reference numerals used in this disclosure may include:

100—electrical box assembly; 200—cover;

300—light source element;

310—first soldering area; 320—light-transmitting bump;

400—circuit board;

410—elastic strip; 420—limiting gap; 430—second soldering area; 440—first light-transmitting hole; 450—mounting groove; 460—third soldering area; 470—through hole;

500—light source holder;

510—limiting post; 520—snap-fit portion; 530—locking bolt; 540—abutment;

550—second light-transmitting hole; 560—avoidance gap;

600—lens; 700—limiting ring.

Sometimes, the circuit board is an overall rigid structure that is not liable to be deformed. Thus, when a clamping force is transferred to the light source element, a stress concentration will occur. If the clamping force as applied is too large, it will be easy to cause cracks and other damages of the light source element due to extrusion, and an excessive extruding force is also prone to cause the phenomenon of de-soldering, resulting in a connection failure between the light source element and the circuit board.

Figure 7:
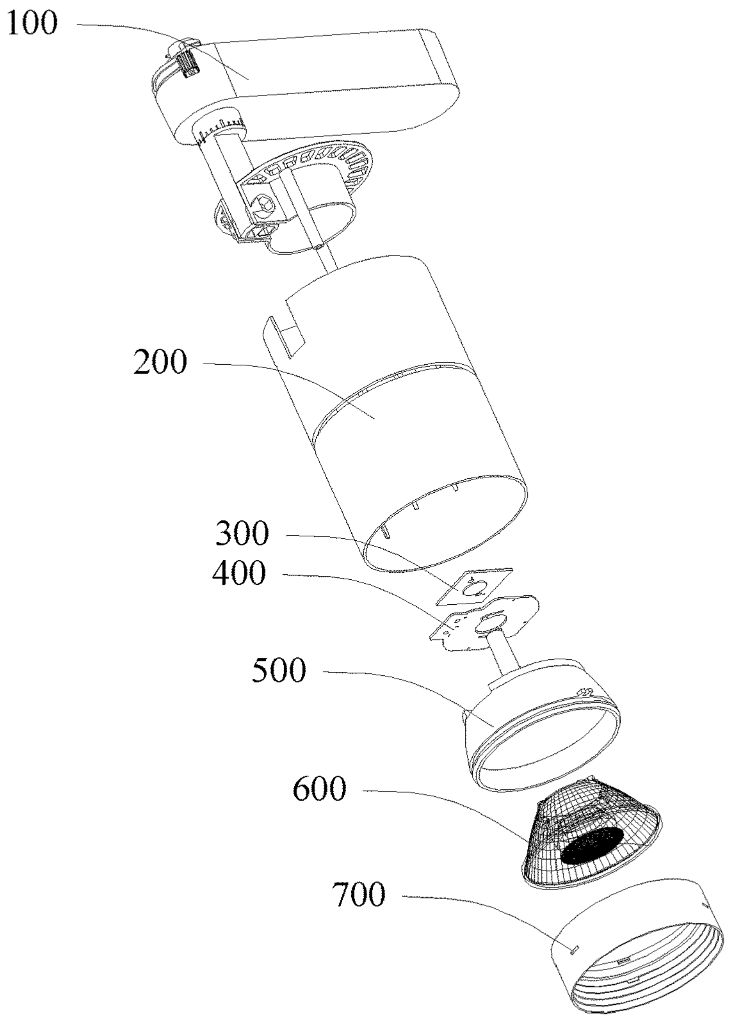
FIG. 7 is an exploded diagram of a lamp disclosed in examples of the present disclosure.

As shown in FIG. 7, the present disclosure discloses a lamp. The lamp here may be any one of LING XIAN track spotlight, HAO platform spotlight, color temperature variable lamp and the like. Specifically, the lamp may include an electrical box assembly 100, a housing 200, a lens 600, a limiting ring 700 and a light source assembly. The housing 200 has a first housing opening and a second housing opening arranged oppositely. The electrical box assembly 100 is disposed at the first housing opening. For example, the electrical box assembly 100 is located outside the housing 200 to block and seal the first housing opening. Both the light source assembly and the lens 600 may be disposed inside the housing.

The light source assembly may include a light source element 300 and a light source holder 500. The light source element 300 is a light-emitting body of the light source assembly, and the structure of the light source element 300 may be a common COB light source, an LED light source, and the like. The light source holder 500 can provide a support base for related components of the light source assembly, for example, it may be a support frame formed by injection molding and other processes. The light source assembly may be connected to the housing 200 through the light source holder 500. Specifically, a groove may be provided at a peripheral portion of the light source holder 500, and a tab may be provided at an inner peripheral wall of the housing 200, so that the light source holder 500 and the housing 200 are snap-fitted with each other. In this way, the housing 200 can provide a shielding protection for the light source assembly and the lens 600. A limiting ring 700 is sleeved at the second housing opening to constrain and fix the light source assembly and the lens 600 in the housing 200.

The light source assembly, the lens 600, and the limiting ring 700 are disposed sequentially in a direction away from the first housing opening; at the same time, a light-emitting side of the light source element 300 is oriented towards the second housing opening, an input lead is disposed within the electrical box assembly 100, and the input lead is connected to the light source assembly. In this way, an electrical energy can be transmitted from the electrical box assembly 100 to the light source assembly to cause the light source assembly to emit light through the light source element 300, and then the light will be emitted to the outside through the second housing opening after a light guiding effect of the lens 600, thereby realizing the illumination of the lamp. The internal components of the light source assembly are introduced in details below.

Referring to FIGS. 1 to 6, the light source assembly disclosed in the present disclosure may further include a circuit board 400. The circuit board 400 is configured to transmit the electrical energy required for the light source element 300 to emit light, and the structure of the circuit board 400 may be a COB circuit board or the like. Specifically, the light source element 300, the circuit board 400 and the light source holder 500 can be stacked sequentially.

Figure 2:
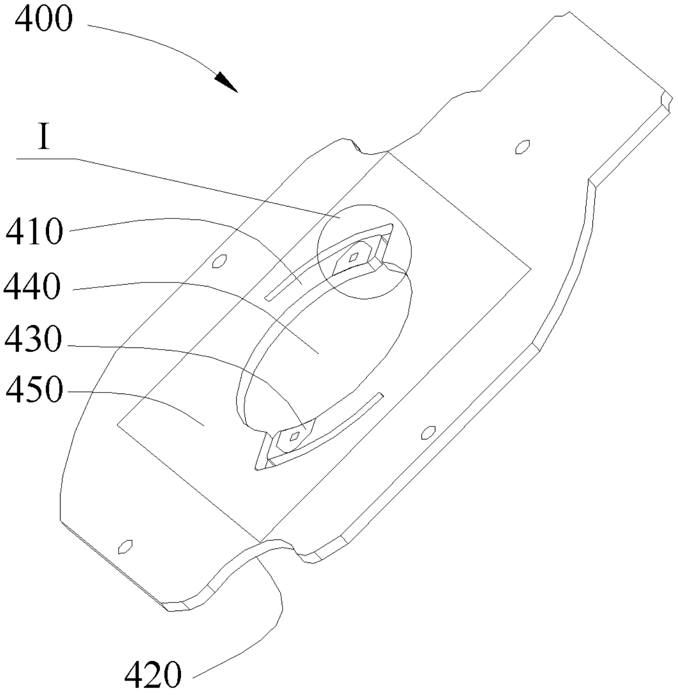
FIG. 2 is a front structural diagram of a circuit board disclosed in examples of the present disclosure.

As shown in FIG. 2, the circuit board 400 is provided with an elastic member thereon, and the light source element 300 is elastically connected to the circuit board 400 by the elastic member. For example, by providing a snap fastener on one of the light source element 300 and the elastic member and by providing a matched, snap hole on the other one, these two can be snap-fitted with each other. The elastic member can be provided to enable the circuit board 400 to be a flexible structure, and to enable a flexible connection between the light source element 300 and the circuit board 400. Specifically, the elastic member may be a structure composed of one or a combination of more of springs, reeds, elastic strips, and the like disposed on the circuit board 400.

Figure 6:
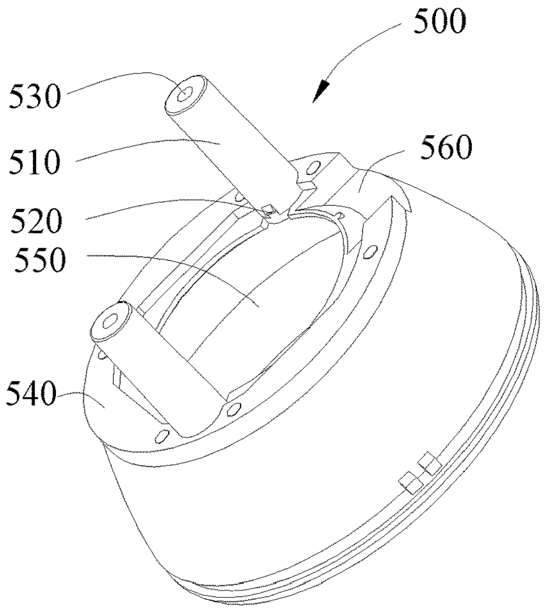
FIG. 6 is a structural diagram of a light source holder disclosed in examples of the present disclosure.

As shown in FIG. 6, the light source holder 500 may be provided with a snap-fit portion 520, and the snap-fit portion 520 can realize the connection between the light source element 300 and the circuit board 400. Specifically, an entirety constituted by the light source element 300 and the circuit board 400 forms a light source board, and the light source board is snap-fitted at the light source holder 500 by the snap-fit portion 520. For example, the snap-fit portion 520 is a structure such as a movable clamping plate, a movable cover plate or the like, so that both the light source element 300 and the circuit board 400 are clamped and fixed on the light source holder 500.

As can be seen, in configurations of such structure, the elastic member is provided so that the circuit board 400 is flexible. In this way, the elastic member on the circuit board 400 will undergo elastic deformations to different extents as the clamping force exerted by the light source holder 500 changes, and under the action of the elastic deformation, an extruding force generated between the light source element 300 and the circuit board 400, especially an extruding force generated between the light source element 300 and a connection position of the elastic member, can be removed. Thereby, it is possible to better avoid excessive extrusion of the light source element 300, thereby avoiding damages such as cracks of the light source element 300 caused by excessive extrusion, as well as avoiding connection failures between the light source element 300 and the circuit board 400 caused by excessive extrusion, in particular connection failures between the light source element 300 and the elastic member.

In an example, as shown in FIG. 2, the circuit board 400 may be provided with a first light-transmitting hole 440, and light emitted from the light source element 300 may exit by passing through the first light-transmitting hole 440. The elastic member may be a structure adapted to the first light-transmitting hole 440. Specifically, the elastic member may be an elastic strip 410, and the elastic strip 410 may be disposed at an outer fringe of the first light-transmitting hole 440.

The light-emitting side of the light source element 300 is connected to the elastic strip 410, and the light-emitting side is provided with a light-emitting area, and the light-emitting-area may be provided with a light-emitting part. For example, in the case where the light-emitting element 300 has a structure of COB light source, the light-emitting area may be configured as a mirrored metal substrate with a high reflectivity, and a LED chip is affixed to the substrate to achieve the light-emitting effect. The light-emitting area is oriented towards the first light-transmitting hole 440, so that light emitted from the light-emitting area can exit through the first light-transmitting hole 440.

Further, the elastic strip 410 may be configured in an arcuate shape. Specifically, the elastic strip 410 may be configured in an arc shape, and the elastic strip 410 may be disposed along a circumferential direction of the first light-transmitting hole 440. A radius of the elastic strip 410 is as same as a radius of the first light-transmitting hole 440, and an arcuated surface of the elastic strip 410 facing towards the first light-transmitting hole 440 may form part of a hole surface of the first light-transmitting hole 440 to improve the overall integration of the circuit board 400 and to facilitate manufacturing and assembling.

Figure 5:
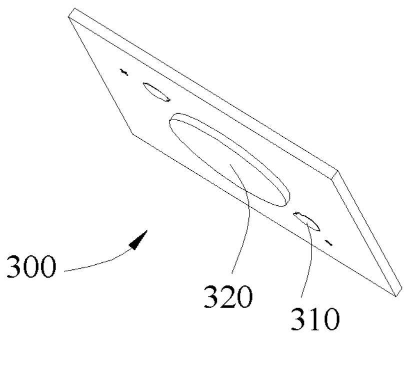
FIG. 5 is a structural diagram of a light source element disclosed in examples of the present disclosure.

Further, as shown in FIG. 5, a light-transmitting bump 320 may be disposed on the light source element 300. The light-transmitting bump 320 may be a transparent housing, and the transparent housing covers the light-emitting body. The light-transmitting bump 320 is adapted to the first light-transmitting hole 440. For example, an interference fit or a clearance fit may be formed therebetween, so that the light-transmitting bump 320 may be disposed in the first light-transmitting hole 440; for example, a transition fit or a clearance fit may be formed therebetween, so that a rapid positioning of the light source element 300 and the circuit board 400 can be realized.

More specifically, there may be provided two elastic strips 410, and these two elastic strips 410 are symmetrically disposed at both sides of the first light-transmitting hole 440 to provide a more stable elastic support for the light source element 300. Of course, it is also possible to provide more than three elastic strips 410 uniformly disposed in a circumferential array on the outer fringe of the first light-transmitting hole 440, which will not be further described here.

Further, two opposite ends of the elastic strip 410 are a connecting end and a free end, respectively. The connecting end is connected to the circuit board 400, and the elastic strip 410 is elastically connected to the light source element 300 by the free end. When an elastic deformation of the elastic strip 410 occurs, a travel of the free end of the elastic strip 410 varies the most, which allows to connect the light source element 300 to the free end, and to better realize the adjustment of a relative position with the circuit board 400, thereby achieving a better effect of removing the extruding force.

As shown in FIGS. 2 and 5, for the specific connection mode between the light source element 300 and the circuit board 400, a first soldering area 310 may be disposed on a side of the light source element 300 facing towards the circuit board 400, and a second soldering area 430 may be disposed on a side of the elastic strip 410 facing towards the light source element 300, so that the light source element 300 is soldered to the second soldering area 430 through the first soldering area 310, thereby soldering the light source element 300 to the circuit board 400.

Figure 3:
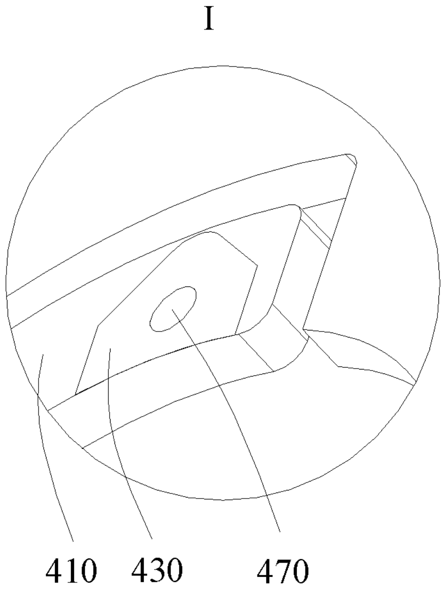
FIG. 3 is an enlarged diagram at position I in FIG. 2 disclosed in examples of the present disclosure.

In another example, the light source element 300 and the circuit board 400 may be soldered to each other by means of SMT reflow soldering. In order to further strengthen the firmness of such soldering, a through hole 470 may be disposed in the elastic strip 410, as shown in FIG. 3. The through hole 470 is opened along a thickness direction of the elastic strip 410. The through hole 470 has a first orifice and a second orifice opposite to each other. The first orifice is located in the second soldering area 430, and the second orifice is located at a side of the elastic strip 410 facing away from the second soldering area 430. For soldering, a solder paste is coated in the second soldering area 430, and a part of the solder paste flows from the first orifice into the second orifice through the through hole 470, and ultimately remains at the side of the elastic strip 410 facing away from the second soldering area 430. In this way, the elastic strip 410 can have solder paste on both of the two opposite sides, thereby enhancing the soldering force, and allowing the light source element 300 to be more firmly soldered on the elastic strip 410.

As an alternative, a bonding method may also be used instead of the soldering method. For example, by applying a conductive adhesive on the elastic strip 410, and causing the conductive adhesive to be reserved in the through hole 470 and reserved at both sides of the elastic strip 410, it is also possible to achieve the effect of firmly connecting the light source element 300 to the elastic strip 410, which will not be further described here.

More specifically, the second soldering area 430 may be located at the free end of the elastic strip 410. As described above, by connecting the light source element 30 at this position, the extruding force subjected by the light source element 300 can be better removed, and abnormalities such as de-soldering and connection failures between the light source element 300 and the elastic strip 410 can also be avoided.

Further, the two opposite sides of the elastic strip 410 may be planar surfaces so that materials such as solder paste may be better adhered to the elastic strip 410, and that the connection between the elastic strip 410 and the light source element 300 is more firm.

In some alternative examples, the specific structure of the snap-fit portion 520 is shown in FIG. 6. The light source holder 500 may include a limiting post 510 and an abutment 540, and the abutment 540 is a base bearing structure of the light source holder 500.

The abutment 540 may be provided with a second light-transmitting hole 550. The second light-transmitting hole 550 is opened in a same direction as the first light-transmitting hole 440, and an entirety constituted by the second light-transmitting hole 550 and the first light-transmitting hole 440 forms a light-transmitting hole, an arrangement of which enables the light source assembly to realize illumination. Specifically, the first light-transmitting hole 440 is located between the light-emitting area and the second light-transmitting hole 550, so that the light emitted from the light-emitting area exits to the outside through the first light-transmitting hole 440 and the second light-transmitting hole 550 in sequence.

The limiting post 510 may be protruded from a side of the abutment 540 facing towards the circuit board 400, and the limiting post 510 is provided with a snap gap which is the snap-fit portion 520. Both the light source element 300 and the circuit board 400 are snap-fitted in the snap gap, and a clamping force may be applied to the light source element 300 and the circuit board 400 at the same time by means of the snap-fitting effect of the snap gap, thereby fixing the light source element 300 and the circuit board 400 on the limiting post 510.

More specifically, the circuit board 400 is provided with a light source mounting area, the light source mounting area is located at a middle region of the circuit board 400, and the light source element 300 may be disposed in the light source mounting area. A portion of the circuit board 400 that surrounds the light source mounting area is a lap board, and the lap board is provided with a limiting gap 420, and the limiting gap 420 is adapted to the limiting post 510. In a specific assembling process, firstly, the light source element 300 and the circuit board 400 are soldered integrally, and then the limiting gap 420 is aligned with the limiting post 510, and then an entirety constituted by the light source element 300 and the circuit board 400 is pressed downwardly towards the abutment 540, and the light source element 300 and the circuit board 400 are ultimately snap-fitted in the snap-fit portion 520. In this case, the limiting gap 420 is located at a position that overlaps with the limiting post 510, and the limiting gap 420 is in a limited fit with the limiting post 510, so that the limiting post 510 can stop the circuit board 400 from rotating in a circumferential direction.

As it can be seen, the matching fit between the limiting gap 420 and the limiting post 510 may enable an entirety constituted by the light source element 300 and the circuit board 400 to be assembled on the light source holder 500 according to a specific orientation, thereby accelerating the assembling efficiency of the device of the present disclosure, as well as providing a circumferential fixation for the entirety constituted by the circuit board 400 and the light source element 300.

More specifically, the snap-fit portion 520 may be disposed at a connection between the limiting post 510 and the abutment 540, so that the lap board may be lapped on a surface of the abutment 540 for disposing the limiting post 510. Meanwhile, it's also possible to provide two limiting posts 510 arranged symmetrically, and corresponding two limiting gaps 420, to achieve a better limiting effect.

Still further, the limiting post 510 may be provided with a threaded hole, the threaded hole is opened along an axial direction of the limiting post 510 and extends from an end of the limiting post 510 away from the abutment 540 to the snap-fit portion 520. The threaded hole may be provided with a locking bolt 530 therein for threaded connection, so that when screwed into the threaded hole, the locking bolt 530 can force the light source element 300 and the circuit board 400 to be tightly pressed against the snap-fit portion 520, thereby producing a more effective fixing effect for the light source element 300 and the circuit board 400.

Figure 4:
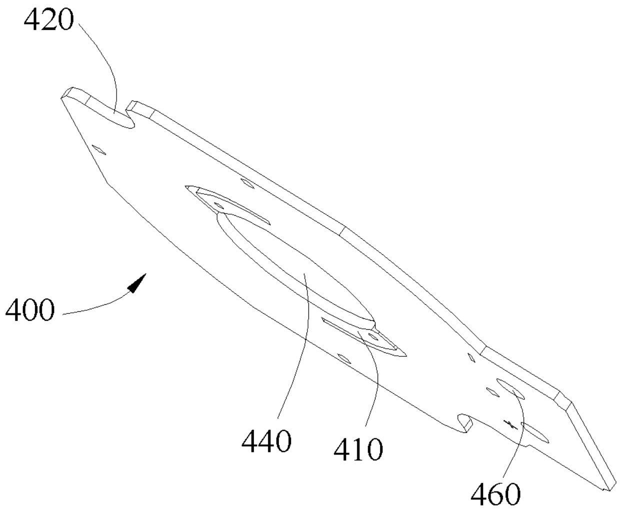
FIG. 4 is a backside structure diagram of a circuit board disclosed in examples of the present disclosure.

Still further, as shown in FIG. 4, the circuit board 400 may be provided with a third soldering area 460. The third soldering area 460 is disposed at a side of the circuit board 400 away from the first light-transmittance hole 440. An input lead in the electrical box assembly 100 may be routed inside the housing 200 and connected to the third soldering area 460 to allow the electrical energy to be transmitted to the second soldering area 430 through the third soldering area 460 and ultimately transmitted to the light source element 300 to cause the light source element 300 to emit light.

This layout can reduce the arrangement of the soldering position, and can also prevent the input lead as arranged from entering the position of the first light-transmitting hole 440 to avoid interfering with a light emission of the light source element 300. Further, the third soldering area 460 is disposed on a side of the circuit board 400 facing away from the second soldering area 430, and is disposed on the lap board of the circuit board 400, so that the third soldering area 460 can be farther away from the second soldering area 430 to provide a better anti-interference effect.

At the same time, the abutment 540 may also be provided with an avoidance gap 560. The avoidance gap 560 may be disposed at a side of the second light-transmitting hole 550, and the third soldering area 460 is oriented towards the avoidance gap 560 and is spaced apart from a bottom surface of the avoidance gap 560, so as to facilitate the input lead to be connected to the third soldering area 460.

Still further, the circuit board 400 may be provided with a mounting groove 450 at a side of the circuit board 400 facing away from the light source holder 500. The mounting groove 450 is the light source mounting area. A shape of the mounting groove 450 is adapted to a shape of the light source element 300, and the light source element 300 may be disposed in the mounting groove 450. For example, the light source element 300 is a structure of a rectangular light source board, and the mounting groove 450 is a rectangular groove, so that the light source element 300 can be embedded in the mounting groove 450. Of course, an appearance of the light source element 300 may have other shapes such as a circle, and the mounting groove 450 is also in a shape consistent with the light source element 300, which is not limited in the present disclosure. At the same time, both the first light-transmitting hole 440 and the elastic strip 410 may be disposed at a bottom of the mounting groove 450 to be cooperated with the light source element 300 accordingly.

This design can play a role in pre-positioning the light source element 300, and can prevent the light source element 300 from shaking or shifting its position during use by means of the restraint of the mounting groove 450, thereby ensuring the firmness of the connection between the light source element 300 and the circuit board 400, as well as the accuracy of the relative position more effectively.

The present disclosure provides a light source assembly and a lamp to solve the problems such as cracks and connection failures that may occur when the light source element is subjected to an excessive extrusion.

A light source assembly, including a light source element, a circuit board and a light source holder which are sequentially stacked, wherein the circuit board is provided with an elastic member, and the circuit board is elastically connected to the light source element through the elastic member, the light source holder is provided with a snap-fit portion, and an entirety constituted by the light source element and the circuit board is snap-fitted at the light source holder through the snap-fit portion.

Further, the circuit board is provided with a first light-transmitting hole, the elastic member is an elastic strip, and the elastic strip is located at an outer fringe of the first light-transmitting hole; a light-emitting side of the light source element is connected to the elastic strip, the light-emitting side is provided with a light-emitting area, and the light-emitting area is orientated towards the first light-transmitting hole.

Further, there are provided two elastic strips, and the two elastic strips are symmetrically disposed at both sides of the first light-transmitting hole.

Further, two opposite ends of the elastic strip are a connecting end and a free end, respectively; the connecting end is connected to the circuit board, and the elastic strip is elastically connected to the light source element through the free end.

Further, a first soldering area is disposed on a side of the light source element facing towards the circuit board, a second soldering area is disposed on a side of the elastic strip facing towards the light source element, and the light source element is soldered to the second soldering area through the first soldering area; the elastic strip is provided with a through hole, the through hole has a first orifice and a second orifice opposite to each other, the first orifice is located at the second soldering area, the second orifice is located at a side of the elastic strip facing away from the second soldering area.

Further, the light source holder includes a limiting post and an abutment, the abutment is provided with a second light-transmitting hole, the second light-transmitting hole is opened in a same direction as the first light-transmitting hole, the first light-transmitting hole is located between the light-emitting area and the second light-transmitting hole, and the limiting post is protruded from a side of the abutment facing towards the circuit board; the limiting post is provided with a snap gap, the snap gap is the snap-fit portion, both the light source element and the circuit board are snap-fitted in the snap gap.

Further, the circuit board is provided with a light source mounting area, the light source element is disposed in the light source mounting area, a portion of the circuit board that surrounds the light source mounting area is a lap board, the lap board is provided with a limiting gap, and the limiting gap is adapted to the limiting post; in a case where both the light source element and the circuit board are snap-fitted in the snap gap, the limiting gap is in limited fit with the limiting post.

Further, the circuit board is provided with a third soldering area, and the third soldering area is disposed at a side of the circuit board away from the first light-transmitting hole; the abutment is provided with an avoidance gap, the avoidance gap is disposed at a side of the second light-transmitting hole, the third soldering area is oriented towards the avoidance gap and is spaced apart from a bottom surface of the avoidance gap.

Further, the circuit board is provided with a mounting groove, the mounting groove is the light source mounting area, a shape of the mounting groove is adapted to a shape of the light source element, the light source element is disposed in the mounting groove; both the first light-transmitting hole and the elastic strip are disposed at a bottom of the mounting groove.

A lamp, including an electrical box assembly, a housing and the light source assembly; the housing is provided with a first housing opening and a second housing opening arranged opposite to each other, the electrical box assembly is disposed at the first housing opening, the light source assembly is disposed inside the housing, the light source assembly is connected to the housing through the light source holder, and a light-emitting side of the light source element is oriented towards the second housing opening.

The present disclosure achieves the following beneficial effects.

The present disclosure enables a flexible circuit board by providing an elastic member on the circuit board. In this way, after the light source element and the circuit board are snap-fitted at the light source holder, even if they are subjected to a large clamping force, the extruding force generated between the light source element and the circuit board, especially the extruding force at the connection position of the light source element and the elastic member can be removed by the elastic deformation of the elastic member, so as to avoid a stress concentration of the light source element, and hence to avoid abnormalities such as cracks and connection failures of the light source element.

The present disclosure discloses a light source assembly, according to the present disclosure, the overall circuit board is formed as a flexible structure through the arrangement of the elastic member, and the elastic member can be elastically deformed with the change of the clamping force, so that the extruding force generated between the light source element and the circuit board, especially the extruding force at the connection position between the light source element and the elastic member is removed through the elastic deformation, thereby avoiding a stress concentration on the light source element, and further avoiding abnormalities such as cracks of the light source element and connection failures between the light source element and the circuit board. The present disclosure also discloses a lamp.

The above are merely examples of the present disclosure, and are not used to limit the present disclosure. For those skilled in the art, various modifications and variations may be made to the present disclosure. Any modification, equivalent substitution, improvement, or the like made within the spirit and principle of the present disclosure should be included in the scope of the present disclosure.

What is claimed is:

1. A light source assembly, comprising a light source element, a circuit board and a light source holder which are sequentially stacked, wherein:

the circuit board is provided with an elastic member, and the circuit board is elastically connected to the light source element through the elastic member, the light source holder is provided with a snap-fit portion, and an entirety constituted by the light source element and the circuit board is snap-fitted at the light source holder through the snap-fit portion;

the circuit board is provided with a first light-transmitting hole, the elastic member is an elastic strip, and the elastic strip is located at an outer fringe of the first light-transmitting hole, a light-emitting side of the light source element is connected to the elastic strip, the light-emitting side is provided with a light-emitting area, and the light-emitting area is orientated towards the first light-transmitting hole;

a first soldering area is disposed on a side of the light source element facing towards the circuit board, a second soldering area is disposed on a side of the elastic strip facing towards the light source element, and the light source element is soldered to the second soldering area through the first soldering area, and the elastic strip is provided with a through hole, the through hole has a first orifice and a second orifice opposite to each other, the first orifice is located at the second soldering area, the second orifice is located at a side of the elastic strip facing away from the second soldering area.

2. The light source assembly according to claim 1, wherein there are provided two elastic strips, and the two elastic strips are symmetrically disposed at both sides of the first light-transmitting hole.

3. The light source assembly according to claim 1, wherein two opposite ends of the elastic strip are a connecting end and a free end, respectively; the connecting end is connected to the circuit board, and the elastic strip is elastically connected to the light source element through the free end.

4. The light source assembly according to claim 1, wherein:

the light source holder comprises a limiting post and an abutment, the abutment is provided with a second light-transmitting hole, the second light-transmitting hole is opened in a same direction as the first light-transmitting hole, the first light-transmitting hole is located between the light-emitting area and the second light-transmitting hole, and the limiting post is protruded from a side of the abutment facing towards the circuit board, and the limiting post is provided with a snap gap, the snap gap is the snap-fit portion, both the light source element and the circuit board are snap-fitted in the snap gap.

5. The light source assembly according to claim 4, wherein:

the circuit board is provided with a light source mounting area, the light source element is disposed in the light source mounting area, a portion of the circuit board that surrounds the light source mounting area is a lap board, the lap board is provided with a limiting gap, and the limiting gap is adapted to the limiting post, and both the light source element and the circuit board are snap-fitted in the snap gap, and the limiting gap is in limited fit with the limiting post.

6. The light source assembly according to claim 5, wherein:

the circuit board is provided with a mounting groove, the mounting groove is the light source mounting area, a shape of the mounting groove is adapted to a shape of the light source element, and the light source element is disposed in the mounting groove, and both the first light-transmitting hole and the elastic strip are disposed at a bottom of the mounting groove.

7. The light source assembly according to claim 4, wherein:

the circuit board is provided with a third soldering area, and the third soldering area is disposed at a side of the circuit board away from the first light-transmitting hole, and the abutment is provided with an avoidance gap, the avoidance gap is disposed at a side of the second light-transmitting hole, the third soldering area is oriented towards the avoidance gap and is spaced apart from a bottom surface of the avoidance gap.

8. A lamp, comprising an electrical box assembly, a housing and a light source assembly, wherein:

the light source assembly comprises a light source element, a circuit board and a light source holder which are sequentially stacked, the circuit board is provided with an elastic member, and the circuit board is elastically connected to the light source element through the elastic member, the light source holder is provided with a snap-fit portion, and an entirety constituted by the light source element and the circuit board is snap-fitted at the light source holder through the snap- fit portion, the circuit board is provided with a first light-transmitting hole, the elastic member is an elastic strip, and the elastic strip is located at an outer fringe of the first light-transmitting hole, a light-emitting side of the light source element is connected to the elastic strip, the light- emitting side is provided with a light-emitting area, and the light-emitting area is orientated towards the first light-transmitting hole, the housing is provided with a first housing opening and a second housing opening arranged opposite to each other, the electrical box assembly is disposed at the first housing opening, the light source assembly is disposed inside the housing, the light source assembly is connected to the housing through the light source holder, and a light-emitting side of the light source element is oriented towards the second housing opening;

a first soldering area is disposed on a side of the light source element facing towards the circuit board, a second soldering area is disposed on a side of the elastic strip facing towards the light source element, and the light source element is soldered to the second soldering area through the first soldering area, and the elastic strip is provided with a through hole, the through hole has a first orifice and a second orifice opposite to each other, the first orifice is located at the second soldering area, the second orifice is located at a side of the elastic strip facing away from the second soldering area.

* * * * *